US010233962B2

(12) United States Patent
Ziskovsky et al.

(10) Patent No.: US 10,233,962 B2
(45) Date of Patent: Mar. 19, 2019

(54) METHOD AND APPARATUS FOR PREVENTING LOOSENING OF A THREADED FASTENER

(71) Applicant: Deere & Company, Moline, IL (US)

(72) Inventors: Darren Ziskovsky, Dubuque, IA (US); Austin B. Stephens, Coffeyville, KS (US); Jeffrey S. Turner, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 327 days.

(21) Appl. No.: 15/180,248

(22) Filed: Jun. 13, 2016

(65) Prior Publication Data

US 2017/0356485 A1    Dec. 14, 2017

(51) Int. Cl.
  *F16H 57/12*  (2006.01)
  *F16B 39/24*  (2006.01)
  *F16H 57/08*  (2006.01)

(52) U.S. Cl.
  CPC ........... *F16B 39/24* (2013.01); *F16H 57/082* (2013.01); *F16H 57/12* (2013.01)

(58) Field of Classification Search
  None
  See application file for complete search history.

(56) References Cited

U.S. PATENT DOCUMENTS

| | | | |
|---|---|---|---|
| 5,295,909 A | | 3/1994 | Heidenreich |
| 6,533,786 B1 | | 3/2003 | Needham et al. |
| 7,727,266 B2 | | 6/2010 | Lindemann et al. |
| 2004/0254044 A1 | * | 12/2004 | Oberstarr ............ B60K 17/046 475/323 |
| 2005/0020400 A1 | * | 1/2005 | Chung .................... B60B 11/06 475/331 |
| 2007/0212191 A1 | * | 9/2007 | Nilsen ................... F16B 37/061 411/162 |
| 2010/0301665 A1 | | 12/2010 | White et al. |

(Continued)

FOREIGN PATENT DOCUMENTS

DE    392491    3/1924

OTHER PUBLICATIONS

McAllister Technical Services, Online catalog, http://old.mcallister.com/graphics/blt27s-x-section.jpg, McAllister Technical Services, USA.

(Continued)

*Primary Examiner* — Justin Holmes
(74) *Attorney, Agent, or Firm* — Klintworth & Rozenblat IP LLP (57) ABSTRACT

A threaded retainer in the form of a flange head capscrew is used alone or in combination with a large diameter washer to axially, frictionally engage a head of, or block, a threaded fastener so as to prevent the fastener from backing out and becoming loose. Any tendency of the threaded fastener to turn in a loosening direction is resisted by the threaded retainer, in a first embodiment, wherein frictional engagement between the flange head and/or large diameter washer causes the threaded retainer to tend to tighten, and in a second embodiment wherein the flange head and/or large diameter washer cooperates with a recess arrangement in the fastener to block loosening of the fastener.

19 Claims, 5 Drawing Sheets

(56) References Cited

U.S. PATENT DOCUMENTS

2017/0120675 A1   5/2017   Chung

OTHER PUBLICATIONS

Wheeldock LLC, Installation of the Wheeldock Chock on a wood decked trailer, Online installation instructions, http://www.wheeldock.com/page/home/resources/wheel-chock-information/chock-installation-wooden-deck, Wheeldock LLC, USA.
Emmanuil Kushnir aand Kevin Wasson, How retaining forces affect spindle bearings, Online article, http://machinedesign.com/archive/how-retaining-forces-affect-spindle-bearings, Machine Design, USA.
User: hafnor, Reel Repair by Alan Tani, Online forum, http://alantani.com/index.php?topic=2587.0, Simple Machines, USA.
German Search Report issued in counterpart application No. 102017206894.9 dated Jan. 3, 2018 (10 pages).

\* cited by examiner

METHOD AND APPARATUS FOR PREVENTING LOOSENING OF A THREADED FASTENER

TECHNICAL FIELD

The present invention resides in the art of devices for preventing threaded releasable fasteners from accidental loosening or becoming disconnected from structure being held in place by the fasteners, and more specifically relates to the retention of such threaded fasteners.

BACKGROUND

Fastening systems are known which include threaded fasteners that are kept from loosening by retainers which block the threaded fastener from loosening. These retainers take many forms such as snap rings, wedge pieces and the like, but lack simplicity and/or reliability.

SUMMARY

Various aspects of examples of the disclosure are set out in the claims.

A first aspect includes a combination of a first component, a second component mounted on the first component for shifting axially along a first axis relative to the first component and occupying a desired axial position relative to the first component, a threaded fastener arrangement is threaded axially into said first component and axially engages the second component for preventing movement of the second component from said desired axial position and a retainer arrangement being in axial engagement with the threaded fastener arrangement and preventing axial movement of the threaded fastener arrangement away from said second component, and wherein the retainer arrangement includes at least one threaded retainer assembly being in frictional engagement with said threaded fastener arrangement and acting in a direction for resisting loosening of said threaded fastener arrangement.

A second aspect includes the at least one threaded retainer including an annular friction applying element associated therewith and tightly engaging the threaded fastener arrangement for resisting axial movement of the threaded fastener arrangement away from the first component; and the annular friction applying element of the at least one threaded retainer acting, in response to the threaded fastener arrangement rotating in the direction for loosening, for transferring a friction force from the threaded fastener arrangement to the at least one threaded retainer tending to cause said at least one threaded retainer to be rotated in a tightening direction, thereby resisting any tendency for the threaded fastener arrangement to loosen.

A third aspect includes the threaded fastener arrangement including a radially extending, annular flange; and the annular friction element overlapping the annular flange.

A fourth aspect includes the annular flange including at least one arcuate recess formed in a perimeter of the flange; and said annular friction element having a perimeter shaped complementary to and received in the at least one recess.

A fifth aspect includes the at least one threaded retainer assembly including a flanged head capscrew with a flange portion of the head engaging a washer forming the friction applying element.

A sixth aspect includes the threaded retainer arrangement including at least a second threaded retainer assembly identical to said at least one threaded retainer assembly, with the at least second threaded retainer assembly being located on an opposite side of said threaded fastener arrangement from said at least one threaded retainer assembly.

A seventh aspect includes the at least one and at least second threaded retainer assemblies each including an annular friction applying element associated therewith and tightly engaging the flange of said threaded retainer assembly for resisting axial movement of the flange away from said second component; and the annular friction applying element of each of the at least one and at least second threaded retainers acting in response to the threaded fastener tending to loosen for transferring frictional forces tending to cause said at least one threaded retainer and said at least second threaded retainer to be tightened thereby resisting loosening of said threaded fastener.

An eighth aspect includes the flange of the threaded fastener being in the form of an annular flange having an exposed, axially facing annular planar surface; and the annular friction element of each of the at least one threaded retainer and at least second threaded retainer overlapping the circular disk and engaging the annular planar surface.

A ninth aspect includes the annular flange having first and second arcuate recesses formed in a perimeter thereof; and the annular friction element of each of the at least one threaded retainer and at least second threaded retainer having a circular perimeter shaped complementary to and respectively received in said first and second arcuate recesses.

A tenth aspect includes each of the at least one threaded retainer assembly and at least second threaded retainer assembly being a flanged head capscrew with a flange portion of the head engaging a washer forming the friction applying element.

According to an eleventh aspect, a method of preventing a threaded fastener from becoming unfastened from a body into which it is threaded for holding an element in place, includes the steps of: (a) providing a threaded retainer being threaded in a direction opposite to a direction in which the threaded fastener is threaded; and (b) frictionally engaging the threaded fastener with at least one threaded retainer for resisting rotation of the threaded fastener in a first direction tending to loosen the threaded fastener a such that rotation of the threaded fastener in the first direction will tend to cause the threaded retainer to rotate in a second direction, opposite to the first direction, tending to tighten the threaded retainer and increase the frictional force resisting loosening of the threaded fastener.

These and other aspects will become apparent from reading the ensuing description together with the appended drawings.

BRIEF DESCRIPTION OF THE DRAWINGS

The detailed description of the drawings refers to the accompanying figures in which.

DETAILED DESCRIPTION OF THE DRAWINGS

At least one example embodiment of the subject matter of this disclosure is understood by referring to FIGS. 1 through 4 of the drawings.

Figure 1:
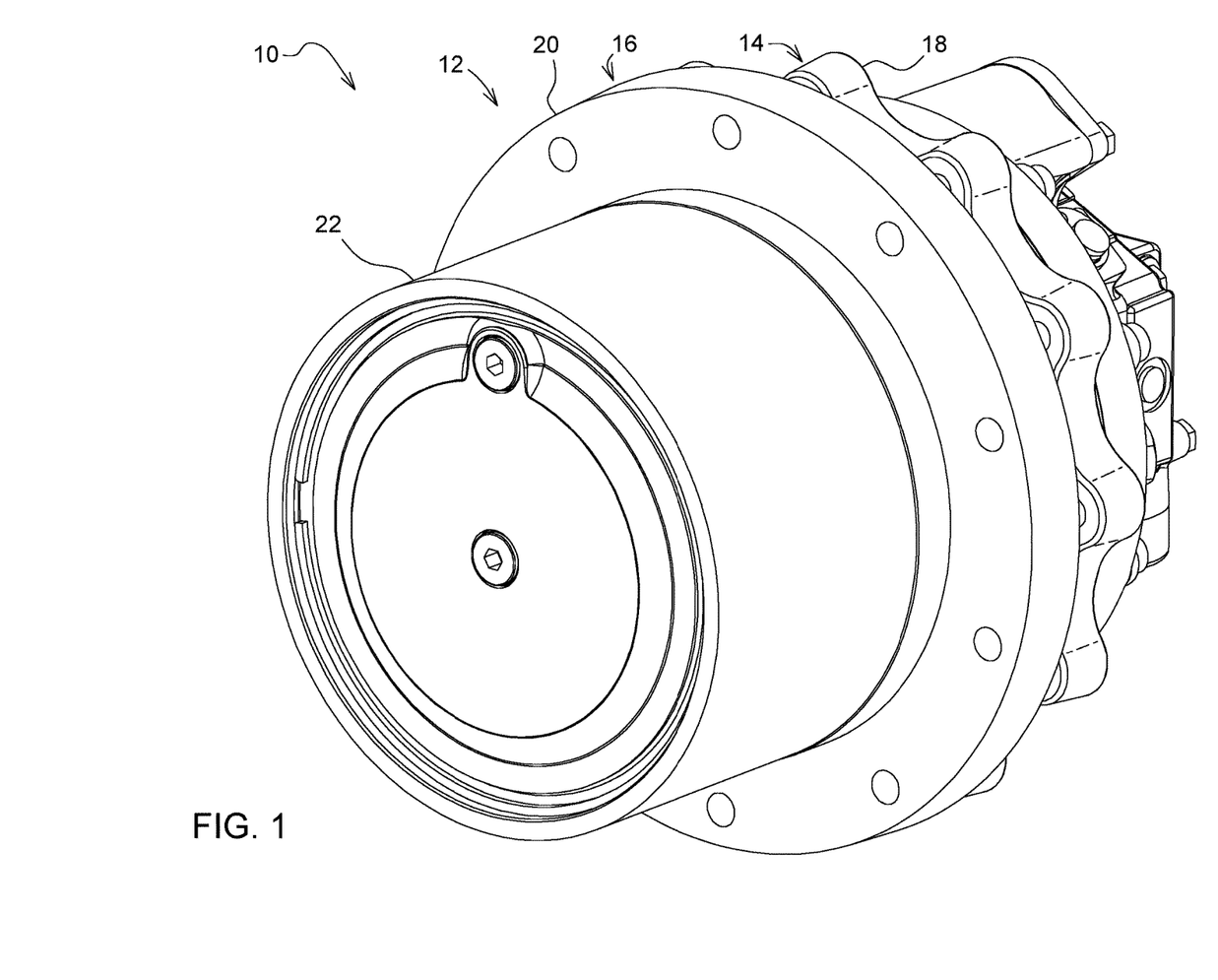
FIG. 1 is a perspective view of a wheel drive transmission embodying the present invention.

FIG. 1 shows a wheel drive transmission 10 including a housing 12 including a fixed section 14 and a rotatable section 16. An outer end of the fixed section 14 is defined by a scalloped mounting flange 18 provided for supporting the transmission 10 from a vehicle structure (not shown). An inner end of the rotatable transmission housing section 16 is defined by a circular, wheel-mounting flange 20 which is coupled to an inner end of a cylindrical portion 22 of the rotatable section 16 which is adapted for receiving a wheel (not shown), with a rim of the wheel being bolted to the flange 20.

Figure 2:
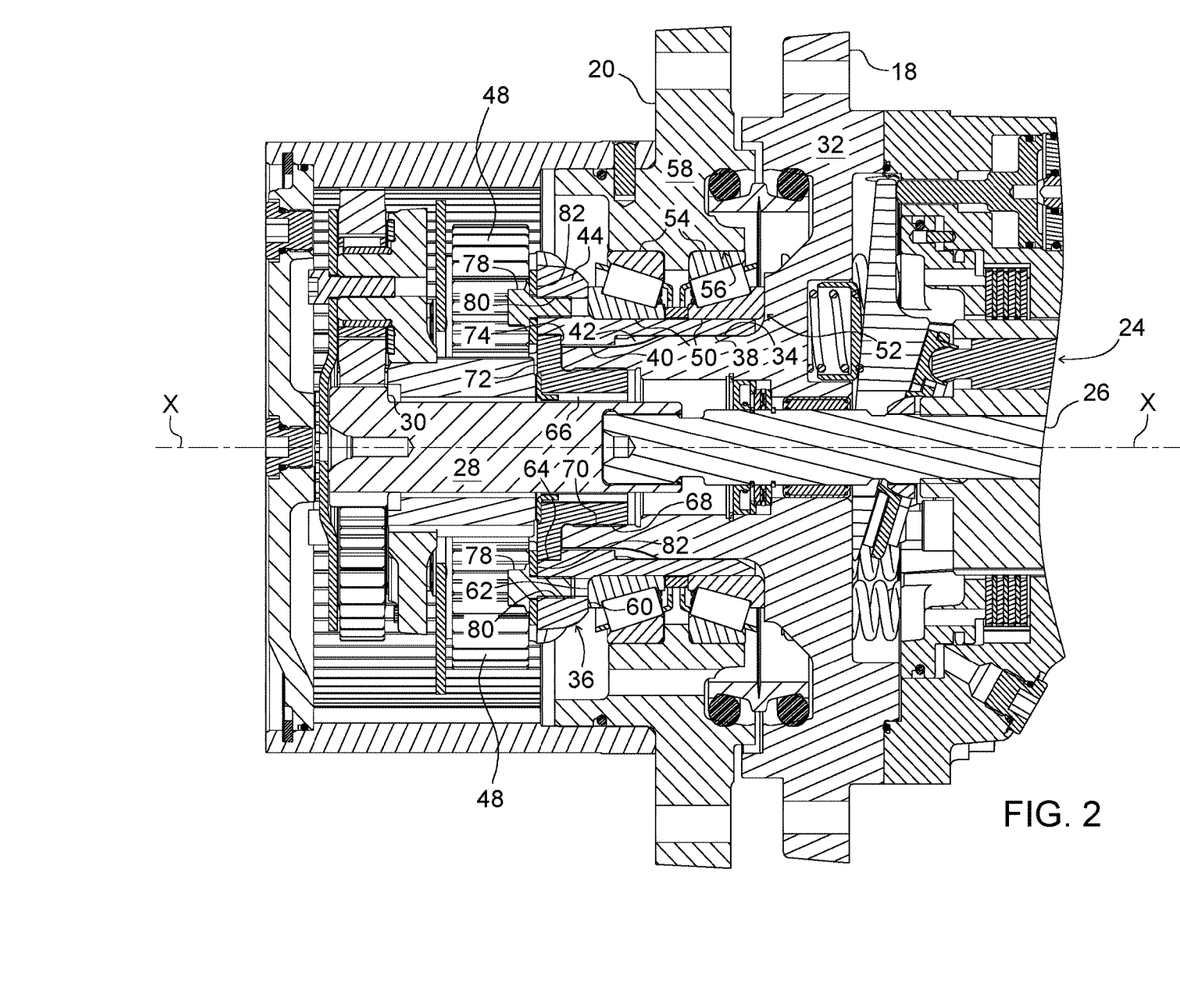
FIG. 2 is a partial, vertical sectional view taken through a central drive axis of the wheel drive transmission of FIG. 1.

Referring now also to FIG. 2, it can be seen that the fixed housing section 14 contains a powered device, a portion of which is shown here as being a hydrostatic motor 24, including a central drive shaft 26 extending axially into the rotatable housing section 16 along an axis of rotation X-X. An outer end of the drift shaft 26 has a splined connection with an inner end of a planetary input shaft 28, the input shaft 28 having an outer end defined by a planetary sun gear 30.

The scalloped mounting flange 18 forms an integral portion of a radially extending interior wall 32 of the housing 14, which rotatably supports the motor drive shaft 26. The wall 32 includes an axially outwardly extending cylindrical support portion or spindle 34. A planetary carrier 36 includes a cylindrical mounting portion or spindle 38 received on the cylindrical support portion 34 of the wall 32 and having an outer end region provided with internal splines 40, engaged with external splines 42 provided on outer end region of the support portion 34 of the wall 32.

Figure 3:
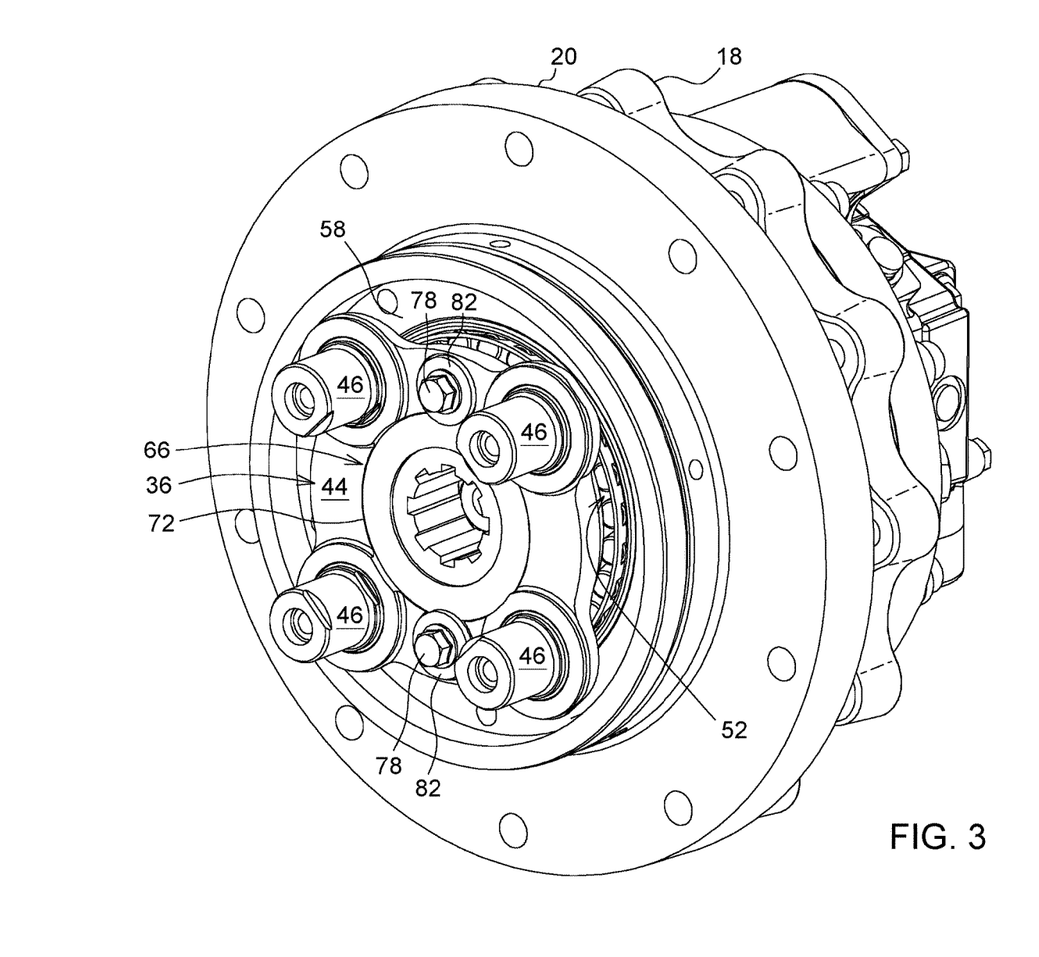
FIG. 3 is a perspective view like FIG. 1, but showing the transmission split at a location spaced outwardly of an annular wheel rim mounting flange and revealing the present invention.
Figure 4:
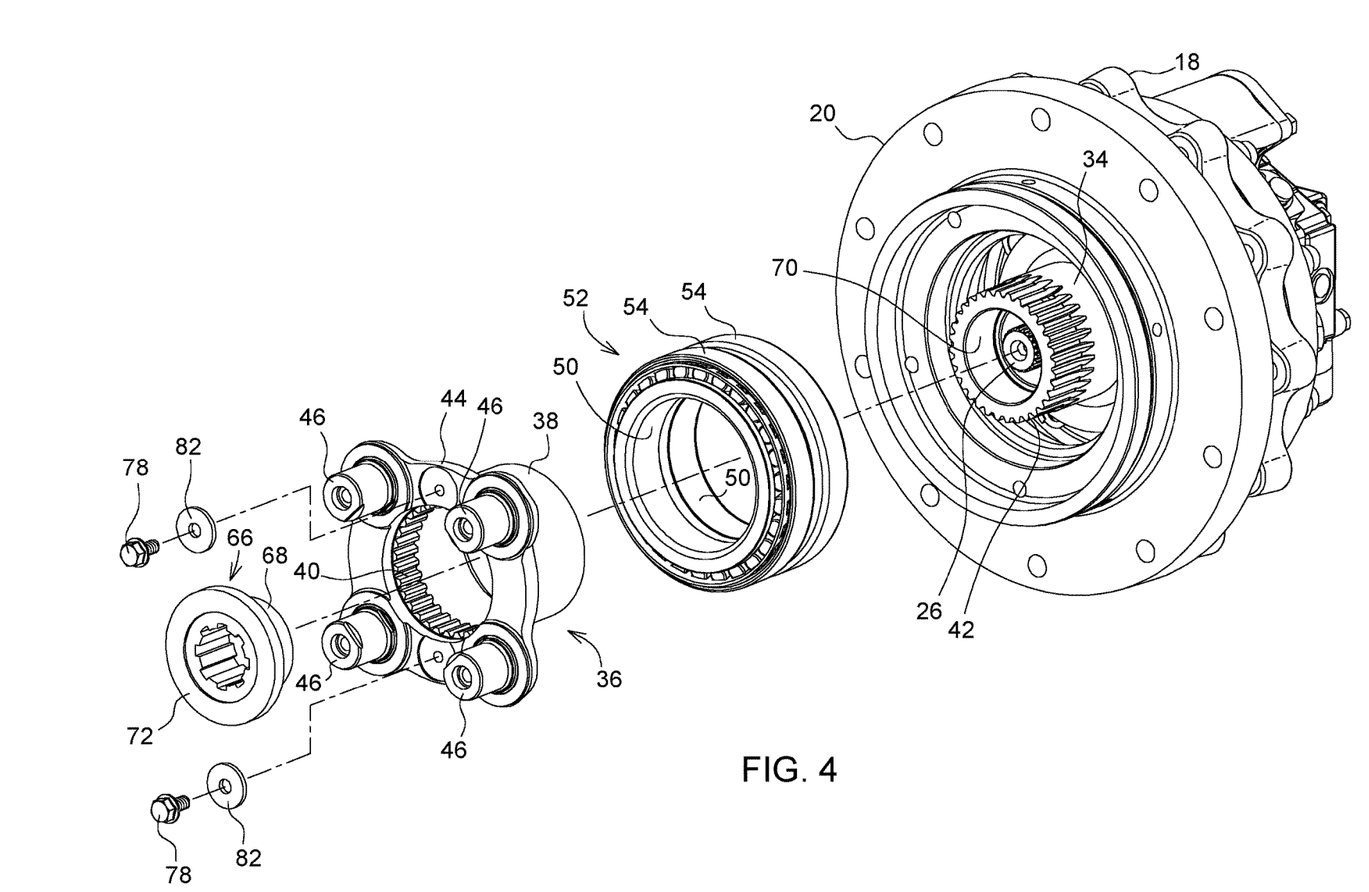
FIG. 4 is a partial exploded view of the wheel drive transmission of FIG. 3 showing the components including the present invention.

Referring now also to FIGS. 3 and 4, it can be seen that the planetary carrier 36 includes a generally circular flange 44 extending radially outward from the outer end of the cylindrical mounting portion 38, with four planet gear mounting spindles 46 (see FIG. 2) being spaced at equal angles about the rotation axis X-X and projecting axially outward from the flange 44. Mounted for rotation on each of the spindles 46 is a planet gear 48.

The cylindrical mounting portion 38 of the planetary carrier 36 serves as a support for inner races 50 of a double-row, tapered roller bearing assembly 52, with outer races 54 of the bearing assembly being fixed in an annular bore arrangement 56 provided in an annular wall 58 integrally joined to, and extending axially inwardly from the wheel mounting flange 20. The flange 44 of the planet carrier 36 has an axially inwardly facing surface 60 engaged with an axially outwardly facing surface 62 of the axially outer inner race 50 of the bearing assembly 52. Located immediately axially outward of the internal splines 40 of the carrier 36 is an annular recess 64.

A cylindrical fastener 66 has an exteriorly threaded inner end section 68 threaded into an interiorly threaded outer end region 70 of the cylindrical support portion 34 of the wall 32 at a radially opposite side of the support portion 34 from the external splines 42. An axially outer end of the fastener 64 includes a radially extending, annular flange 72 having an axially inwardly disposed surface 74 and having an outer radially end region received in the annular recess 64 so that the surface 42 axially abuts the planetary carrier 36, with tightening of the fastener 66 resulting in the surface 60 of the carrier pressing against the axially outward facing, inner race surface 62 of the bearing assembly 52 so as to exert proper clamping forces on the bearing assembly 52.

Together with the cylindrical fastener 66, the present invention includes a retaining arrangement comprising a pair of flanged head capscrews 78 having threaded shanks screwed into respective threaded bores 80 provided at diametrically opposite locations in the radially extending flange 44 of the planet carrier 36. Sandwiched between the flanged head of each of the capscrews 78 and the flange 44 of the planet carrier 36 is a washer 82 having a radially outer region that bears axially against an axially outer surface of the annular flange 72 of the cylindrical fastener 66.

The description of the operation of the present invention follows. Any tendency of the cylindrical fastener 66 to loosen is resisted by the retaining arrangement defined by the two flanged head capscrews 78. Specifically, as viewed in FIG. 3, counterclockwise rotation of the cylindrical fastener 66 will unscrew the fastener from the support portion 34 of the wall 32. However, frictional force at the interface of the washers 82 and the fastener flange 72 will be transferred to an underside of each of the flanged heads of the capscrews 78, with this frictional force tending to drive the capscrews to be rotated clockwise. This direction of rotation tends to screw the capscrews 78 into the planetary carrier 36, thereby tending to tighten them against the cylindrical fastener 66 and resist unscrewing of the latter.

It is here noted that the threaded bores 80 extend axially through the flange 44 of the planetary carrier 36 and are axially aligned with the axially outward facing surface of the inner race of the outer row of tapered roller bearing assembly 52. During disassembly of the transmission 10, once components axially outward of the planetary carrier 36 are removed so as to exposed the planetary carrier, as shown in FIG. 3, screws having a length substantially equal to the axial dimension of the planetary carrier 36 may be substituted for the capscrews 78 and screwed into the threaded bores 80 and against the inner race 50 of the axially outer row of tapered roller bearings and then screwed in further to cause the planet carrier 36 to be shifted axially outward to disengage it from the support portion 34 of the wall 32 and from the tapered roller bearing arrangement 52.

Figure 5:
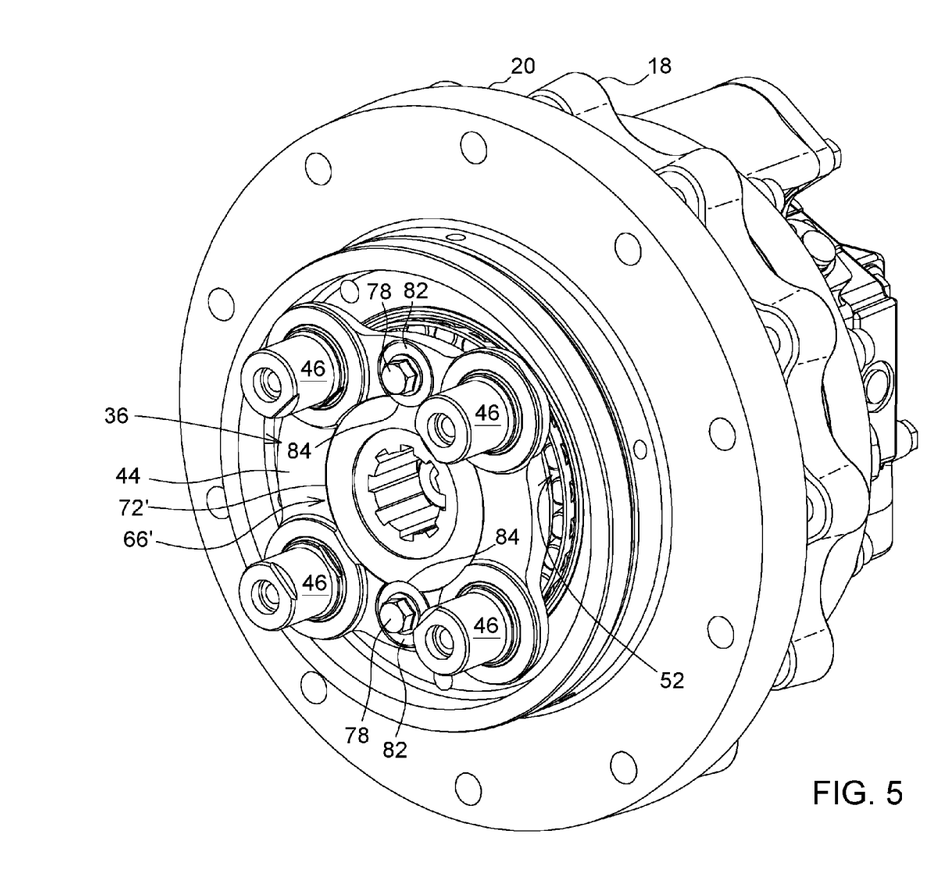
FIG. 5 is a view like FIG. 3, but showing a second embodiment of the invention wherein the circular flange of the threaded retainer is provided with a pair of diametrically opposite circular recesses shaped complementary to, and respectively receiving, the periphery of the washers carried by the pair of flanged head screws.

Referring to FIG. 5, a second embodiment of the invention is illustrated there which, for the most part, is exactly like the embodiment shown in FIGS. 1-4, with the same reference numerals being used to indicate like parts. The only difference between the two embodiments is that in FIG. 5 a fastener 66' is shown that is like the fastener 66 except that a radially extending flange 72' is provided that differs from the flange 72 of the first embodiment only in that it includes diametrically opposite recesses 84 in the perimeter thereof, with the recesses 84 respectively receiving, and being shaped complementary to the washers 82. Thus, instead of acting to exert an axial force on the flange 72', the washers 82 act to prevent loosening rotation of the fastener 66' by presenting an obstacle to, thus blocking such rotation.

While the above describes example embodiments of the present disclosure, these descriptions should not be viewed in a limiting sense. Rather, the retention principles exemplified by the present invention, as defined in the claims can be practiced in a variety of embodiments dealing not only with transmissions but with appropriate structural embodiments of other arts. Stated otherwise, is thought clear that the basic principle of using a threaded retainer to prevent a threaded fastener from unscrewing by arranging the retainer in frictional engagement with the fastener such that frictional forces, generated by the fastener tending to rotate in a loosening direction, tend to rotate the retainer in a tightening direction, can be employed in a large variety of structural arrangements. The same can be said of the principle of preventing unscrewing of a threaded fastener by constructing and locating a threaded fastener and retainer such that the retainer blocks the threaded fastener from rotating in the loosening direction.

What is claimed is:

1. A combination of a first component, a second component mounted on the first component for shifting axially along a first axis relative to the first component and occupying a desired axial position relative to the first component, a threaded fastener arrangement threaded axially into said first component and axially engaging the second component for preventing movement of the second component from said desired axial position and a retainer arrangement being in axial engagement with the threaded fastener arrangement and preventing axial movement of the threaded fastener arrangement away from said second component, the combination further comprising:

said retainer arrangement including at least one threaded retainer assembly being in frictional engagement with said threaded fastener arrangement and acting for blocking loosening of said threaded fastener arrangement;

wherein said at least one threaded retainer assembly includes an annular friction applying element associated therewith and tightly engaging said threaded fastener arrangement for resisting axial movement of said threaded fastener arrangement away from said first component; and wherein said annular friction applying element of said at least one threaded retainer assembly acting, in response to said threaded fastener arrangement rotating in a direction for loosening to transfer a frictional force from said threaded fastener arrangement to said at least one threaded retainer assembly tending to tighten said at least one threaded retainer assembly and thereby tending to increase the frictional force resisting loosening of said threaded fastener arrangement.

2. The combination, as defined in claim 1, wherein the threaded fastener arrangement includes a radially extending, annular flange; and said annular friction element overlapping said annular flange.

3. The combination, as defined in claim 1, wherein said annular flange includes at least one arcuate recess formed in a perimeter of said flange; and said annular friction element having a perimeter shaped complementary to and received in said at least one recess.

4. The combination, as defined in claim 1, wherein said at least one threaded retainer assembly is a flanged head cap screw with a flange portion of the head engaging a washer forming the friction applying element.

5. The combination, as defined in claim 1, wherein the threaded retainer arrangement includes at least a second threaded retainer assembly identical to said at least one threaded retainer assembly, with the at least second threaded retainer assembly being located on an opposite side of said threaded fastener arrangement from said at least one threaded retainer assembly.

6. The combination, as defined in claim 5, wherein said at least one and at least second threaded retainer assemblies each include an annular friction applying element associated therewith and tightly engaging the flange of said threaded retainer assembly for resisting axial movement of the flange away from said second component; and the annular friction applying element of each of the at least one and at least second threaded retainers acting in response to the threaded fastener tending to loosen for transferring frictional forces tending to cause said at least one threaded retainer assembly and said at least second threaded retainer to be tightened thereby resisting loosening of said threaded fastener.

7. The combination, as defined in claim 6, wherein said flange of the threaded fastener is in the form of an annular flange having an exposed, axially facing annular planar surface; and said annular friction element of each of said at least one threaded retainer assembly and at least second threaded retainer overlapping said circular disk and engaging said annular planar surface.

8. The combination, as defined in claim 6, wherein said annular flange includes first and second arcuate recesses formed in a perimeter thereof; and said annular friction element of each of said at least one threaded retainer assembly and at least second threaded retainer having a circular perimeter shaped complementary to and respectively received in said first and second arcuate recesses.

9. The combination, as defined in claim 8, wherein each of said at least one threaded retainer assembly and at least second threaded retainer assembly is a flanged head capscrew with a flange portion of the head engaging a washer forming the friction applying element.

10. A transmission assembly comprising:

a wall defining a first spindle and a planet carrier defining a second spindle mounted for sliding axially along the first spindle to a desired axial location;

a threaded fastener threaded into said first spindle and having a radially extending flange engaged with said planet carrier for securing the second spindle in the desired axial location; and a threaded retainer arrangement including at least one threaded retainer including a shank received in a threaded bore extending axially into said planet carrier with said at least one threaded retainer including a head arrangement joined to the shank and engaging the threaded fastener for blocking loosening of said threaded fastener;

wherein said head arrangement includes a washer lightly engaging said threaded fastener for resisting axial movement of said threaded fastener away from said planet carrier; and wherein said washer acting, in response to said threaded fastener rotating in a direction for loosening, to transfer a friction force from said threaded fastener to said at least one threaded retainer lending to lighten said at least one threaded retainer and thereby lending to increase the friction force resisting loosening of said threaded fastener.

11. The transmission assembly, as defined in claim 10, wherein said head arrangement of the at least one threaded retainer is located in engagement with an axially facing end surface of said flange of said threaded fastener.

12. The transmission assembly, as defined in claim 11, wherein said at least one threaded retainer includes a shank and washer of the head arrangement is received on the shank and extends radially outwardly and overlaps said axially facing end surface of said flange of said threaded fastener; and the washer of said at least one threaded retainer exerting said axial force on the axially facing end surface of said flange of said threaded fastener.

13. The transmission assembly, as defined in claim 10, wherein the washer is received on the shank and extends radially outward of the shank; and said flange of said threaded fastener being provided with a recess shaped complementary to, and receiving a peripheral portion of said washer, whereby said washer engages the flange of said threaded fastener and thereby prevents loosening of said threaded fastener.

14. The transmission assembly, as defined in claim 10, wherein said threaded retainer arrangement includes at least a second threaded retainer, identical to said at least one threaded retainer, being threaded axially into said planet carrier at a location diametrically opposite from said at least one threaded retainer; and the head arrangement of said at least second threaded retainer engaging said threaded fastener for blocking loosening of said threaded fastener.

15. The transmission assembly, as defined in claim 14, wherein said head arrangement of the at least second threaded retainer is located for exerting an axial force on an axially facing end surface of said flange of said threaded fastener.

16. The transmission assembly, as defined in claim 15, wherein the head arrangement of said at least second threaded retainer includes a washer extending radially outward of the threaded shank of the at least second threaded retainer; and
the washer of the at least second threaded retainer exerting said axial force on the axially facing end surface of said flange of said threaded fastener.

17. The transmission assembly, as defined in claim 15, wherein the head arrangement of said at least second threaded retainer includes a washer extending radially outward of the threaded shank of the at least second threaded retainer; and
said flange of the threaded fastener including first and second recesses respectively shaped complementary to and receiving outer peripheral portions of the respective washers of the at least one and at least second threaded retainers, thereby blocking loosening of the threaded fastener.

18. The transmission, as defined in claim 14, and further including a bearing assembly having an inner race arrangement mounted on said spindle of the planet carrier; and said planet carrier including an annular flange abutting an axially facing surface of said inner race arrangement of the bearing assembly; and the threaded shanks of said at least one and second threaded fasteners being respectively located in first and second threaded bores extending axially through said annular flange of the planet carrier in axial alignment with the axially facing surface of the inner race arrangement, whereby, during disassembly of the planet carrier from the bearing assembly, the at least one and second threaded fasteners can be removed for permitting first and second longer threaded fasteners to be respectively threaded into the first and second threaded bores for the purpose of exerting an axial force on the inner race arrangement for causing the planet carrier to separate axially from the bearing assembly.

19. A method of preventing a threaded fastener from becoming unfastened from a body into which it is threaded for holding an element in place, comprising the steps of:
  a) providing at least one threaded retainer including a threaded shank carrying a radially outwardly extending head arrangement; and
  b) placing the at least one threaded retainer in a position blocking loosening of the threaded fastener;
  wherein the step of placing includes frictionally engaging the threaded fastener with the head arrangement of the at least one threaded retainer for resisting rotation of the threaded fastener in a first direction tending to loosen the threaded fastener, with the rotation in the first direction transferring a frictional force through the head arrangement to the threaded retainer tending to tighten the threaded retainer and thereby lending to increase the frictional force resisting loosening of the threaded fastener.

* * * * *

UNITED STATES PATENT AND TRADEMARK OFFICE
CERTIFICATE OF CORRECTION

PATENT NO. : 10,233,962 B2
APPLICATION NO. : 15/180248
DATED : March 19, 2019
INVENTOR(S) : Ziskovsky et al.

Page 1 of 1

It is certified that error appears in the above-identified patent and that said Letters Patent is hereby corrected as shown below:

On the Title Page

Page 2, Column 1, Item (56), under "Other Publications", Line 5, delete "aand" and insert -- and --, therefor.

In the Claims

In Column 6, Claim 10, Line 54, delete "lending to lighten" and insert -- tending to lighten --, therefor.

In Column 6, Claim 10, Line 55, delete "lending" and insert -- tending --, therefor.

In Column 8, Claim 19, Line 36, delete "lending" and insert -- tending --, therefor.

Signed and Sealed this
Thirtieth Day of July, 2019

Andrei Iancu
*Director of the United States Patent and Trademark Office*